(12) United States Patent
Oka et al.

(10) Patent No.: US 10,556,767 B2
(45) Date of Patent: Feb. 11, 2020

(54) WORKPIECE STORAGE METHOD

(71) Applicant: HONDA MOTOR CO., LTD., Tokyo (JP)

(72) Inventors: Keiichiro Oka, Tochigi (JP); Daisuke Ueno, Tochigi (JP); Tsutomu Ogasawara, Tochigi (JP); Hideki Shigematsu, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/641,559

(22) Filed: Jul. 5, 2017

(65) Prior Publication Data
US 2018/0009621 A1 Jan. 11, 2018

(30) Foreign Application Priority Data

Jul. 6, 2016 (JP) .................................. 2016-134344

(51) Int. Cl.
*B65H 29/24* (2006.01)
(52) U.S. Cl.
CPC .......... *B65H 29/246* (2013.01); *B65H 29/247* (2013.01)
(58) Field of Classification Search
CPC .... B65H 31/10; B65H 29/245; B65H 29/246; B65H 29/247; B65H 29/248; B65H 29/26; B65H 31/16; B65H 2406/12; B65H 2406/13; B65H 2301/4212; B65H 2406/1222; B65H 2801/21; B65H 2601/211; B65H 29/70
See application file for complete search history.

(56) References Cited

U.S. PATENT DOCUMENTS

| 1,193,627 | A | * | 8/1916 | Staude | .................... B31B 21/00 271/195 |
| 2,191,881 | A | * | 2/1940 | Erikson | .................... B41F 23/00 101/420 |

(Continued)

FOREIGN PATENT DOCUMENTS

| DE | 102005025743 A1 * | 2/2006 | ............. B65H 29/24 |
| JP | 02-022963 U | 2/1990 | |

(Continued)

OTHER PUBLICATIONS

Japanese Office Action dated Mar. 27, 2018, 3 pages.

*Primary Examiner* — Gregory W Adams
(74) *Attorney, Agent, or Firm* — Rankin, Hill & Clark LLP

(57) ABSTRACT

A first leading end plate and a first rear end plate are provided at an upper part of a rotary table. When a conductor piece contacts the first leading end plate, a first contact detection sensor detects a contact of the conductor piece, and transmits a contact detection signal to a storage control unit. Upon receiving the contact detection signal, the storage control unit drives an air supply device for a predetermined period to spray air toward the conductor piece from a first air nozzle. The air spray brings the conductor piece into a tilted state with the rear end thereof moved downward. Even when the conductor piece contacts the first leading end plate and rebounds, the rear end thereof contacts an inner wall surface of the first rear end plate, thereby preventing the rear end of the conductor piece from getting over the first rear end plate.

10 Claims, 10 Drawing Sheets

(56) References Cited

U.S. PATENT DOCUMENTS

| | | | | |
|---|---|---|---|---|
| 2,299,259 A * | 10/1942 | Sites | B65H 29/247 239/538 |
| 2,769,495 A * | 11/1956 | Pomper | B65H 29/247 271/177 |
| 3,090,503 A * | 5/1963 | Curtenius | B65H 29/34 414/788.9 |
| 3,491,902 A * | 1/1970 | Waldura | B65H 29/245 271/189 |
| 3,503,607 A * | 3/1970 | Gluskin | B65H 29/32 271/195 |
| 3,556,519 A * | 1/1971 | Keller | B41F 23/06 271/177 |
| 3,848,725 A * | 11/1974 | Toby | B65G 13/11 198/418.6 |
| 4,036,087 A * | 7/1977 | Braun | B21D 43/22 271/211 |
| 4,168,831 A * | 9/1979 | Rebel | B65H 29/247 271/177 |
| 4,239,205 A * | 12/1980 | Bourque | B65H 29/001 271/175 |
| 4,298,413 A * | 11/1981 | Teare | B28B 5/027 156/269 |
| 4,372,550 A * | 2/1983 | Woods | B65H 29/247 271/195 |
| 4,441,702 A * | 4/1984 | Nagel | B65H 29/247 271/177 |
| 4,593,894 A * | 6/1986 | Woods | B65H 29/247 271/177 |
| 4,702,468 A * | 10/1987 | Pollich | B65H 29/247 271/195 |
| 5,123,807 A * | 6/1992 | Nakaoda | B65H 43/00 271/189 |
| 5,671,918 A * | 9/1997 | Hofmann | B65H 29/247 271/182 |
| 6,984,098 B2 * | 1/2006 | Tsukahara | B65G 33/06 414/794.2 |
| 7,125,216 B2 * | 10/2006 | Grewe | B26D 7/0675 414/790.8 |
| 8,042,803 B2 * | 10/2011 | Lee | B65H 29/14 271/177 |

FOREIGN PATENT DOCUMENTS

| | | |
|---|---|---|
| JP | 08-091665 A | 4/1996 |
| JP | H08-324866 | 12/1996 |
| JP | 2900288 B2 | 6/1999 |

* cited by examiner

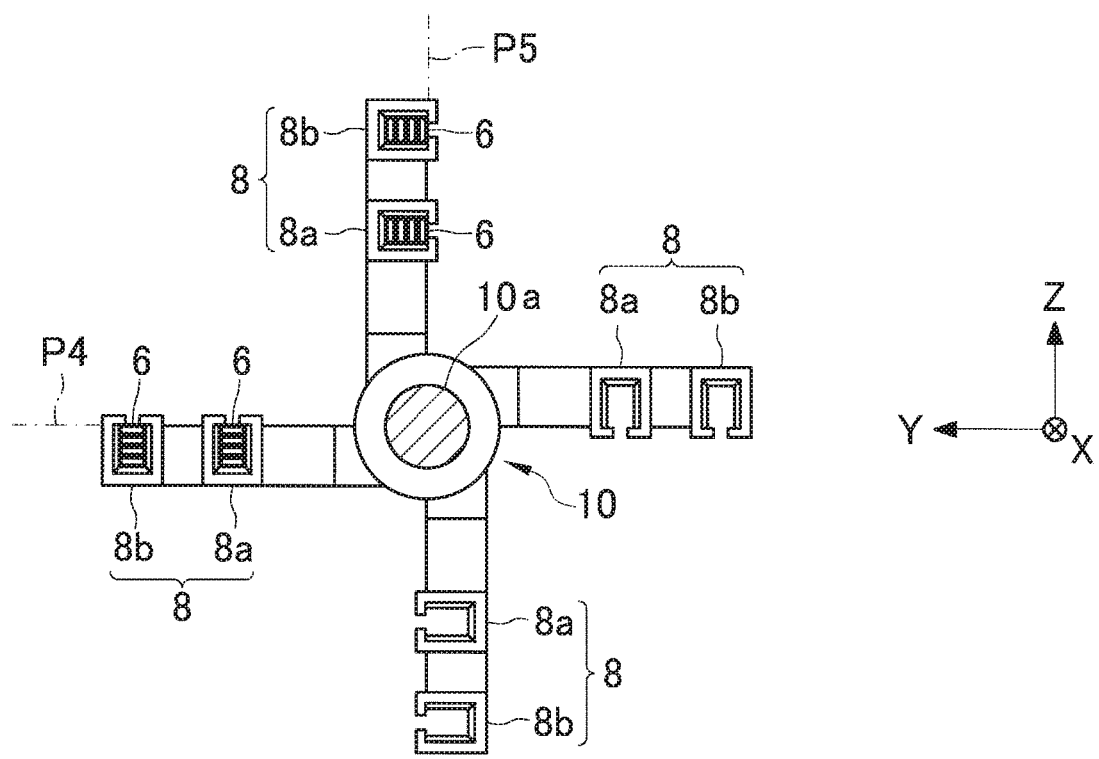

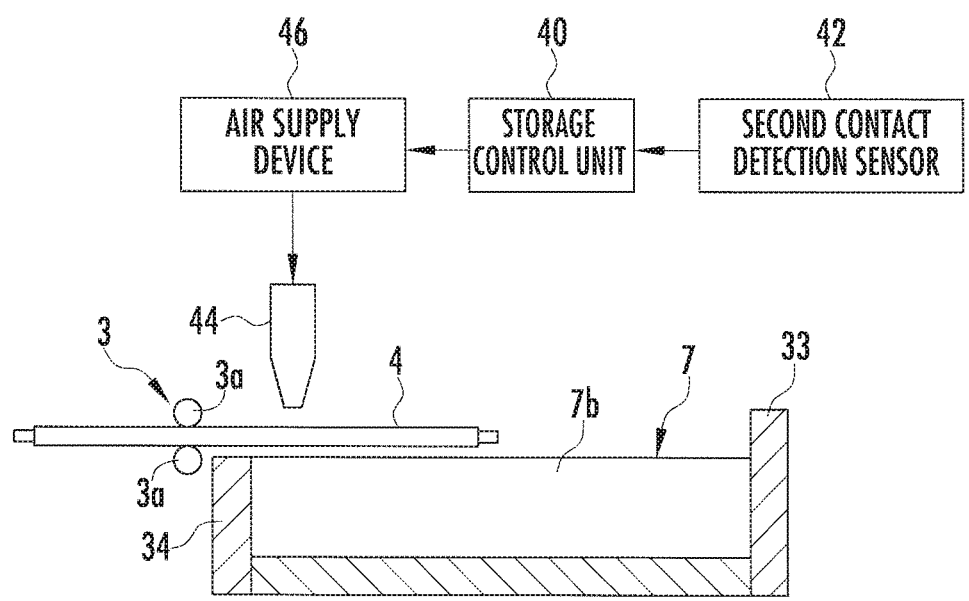

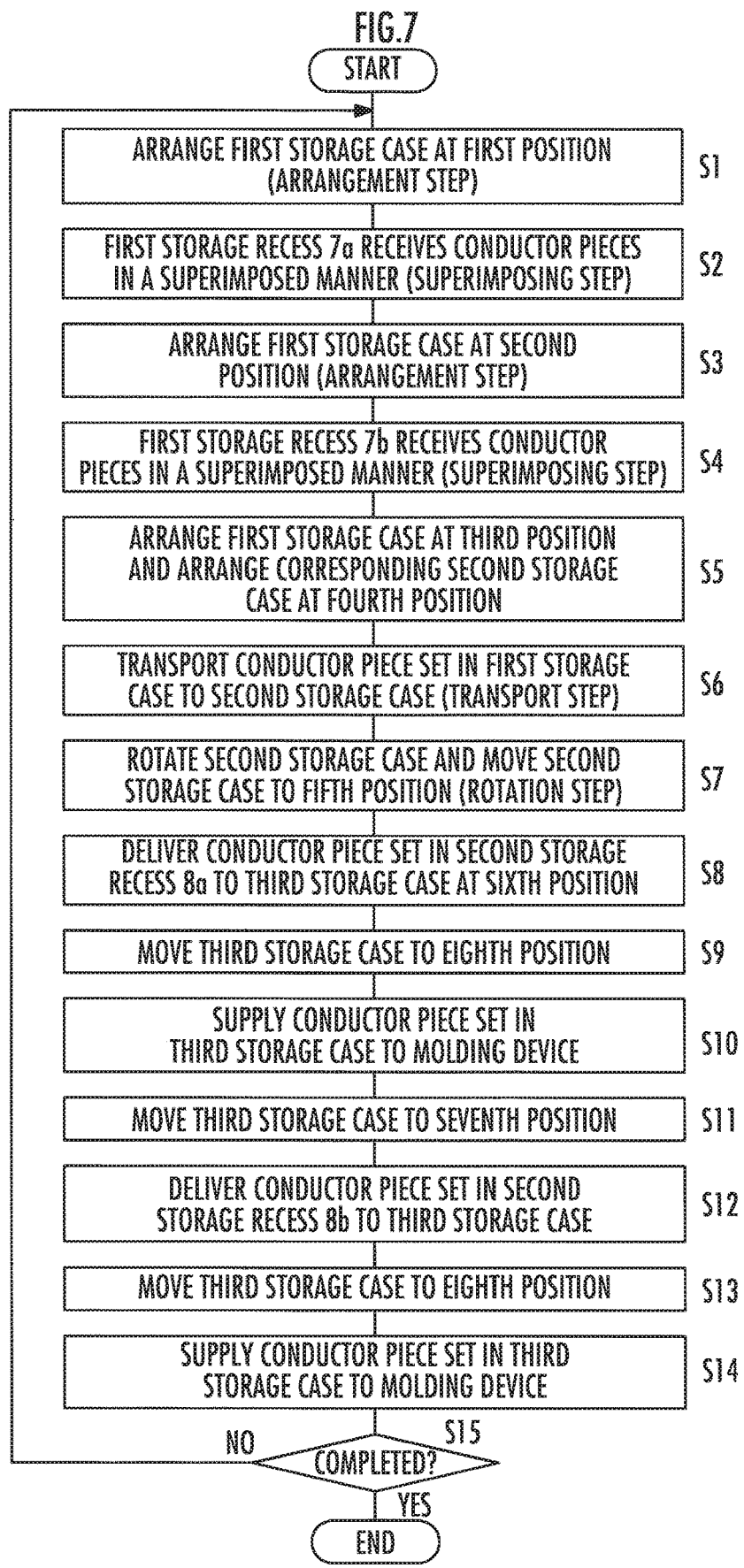

WORKPIECE STORAGE METHOD

BACKGROUND OF THE INVENTION

Field of the Invention

The present invention relates to a workpiece storage method for storing conveyed workpieces.

Description of the Related Art

As a method for storing workpieces conveyed by a conveying device in a storage area formed by an anterior wall, which is provided on the front side of a workpiece conveyance direction, and a posterior wall, which is provided on the rear side of the workpiece conveyance direction, there is known a device for storing workpieces in the storage area by bringing a leading end of each workpiece into contact with the anterior wall to lose their momentum in the workpiece conveyance direction (for example, see Japanese Patent Laid-Open No. H08-324866).

In a method and device for stacking carried sheets as disclosed in Japanese Patent Laid-Open No. H08-324866, as shown in FIG. 10A, when a workpiece (sheet) 100 delivered in the horizontal direction from a conveyance line C is stored in a storage area formed by a front end stopper 101, a fixed side stopper 102, a movable rear end block 103, and a loading arm 104, an air is ejected from an air ejection device 105 obliquely downward from above the storage area, thereby moving the workpiece 100 in such a manner that the leading end of the workpiece 100 moves downward as shown in FIG. 10B, and bringing the leading end of the workpiece 100 into contact with an inner wall surface of the front end stopper 101.

In the method disclosed in Japanese Patent Laid-Open No. H08-324866, after the workpiece 100 is delivered from the conveyance line C, the front end of the workpiece 100 is hanging down due to the weight of the workpiece 100 and the air injected obliquely forward. As shown in FIG. 10C, when the leading end of the workpiece 100 contacts the inner wall surface of the front end stopper 101, the front end of the workpiece 100 is hanging down and rebounds in such a manner that the rear end of the workpiece is lifted. When the rear end of the workpiece 100 rebounds backward while being lifted, as shown in FIG. 10l), the rear end of the workpiece 100 may get over the movable rear end block 103 and move outside the storage area. In such case, the workpiece 100 cannot be stored in the storage area.

SUMMARY OF THE INVENTION

The present invention has been made in view of the above-mentioned circumstances, and an object of the present invention is to provide a workpiece storage method capable of reliably storing workpieces.

A workpiece storage method according to the present invention conveys a workpiece, brings a leading end of the workpiece into contact with an anterior wall provided on a front side of a conveyance direction of the workpiece, and stores the workpiece in a storage area formed of the anterior wall and a posterior wall provided on a rear side of the conveyance direction of the workpiece, the workpiece storage method including: a pressure control step of controlling a pressure of gas within the storage area in such a manner that a rear end side of the workpiece with respect to a center of the workpiece is moved downward when the workpiece is conveyed to the storage area, the center of the workpiece being a center of gravity of the workpiece.

According to the workpiece storage method of the present invention, the pressure of the gas within the storage area is controlled in such a manner that the rear end of the workpiece with respect to the center of the workpiece, which is the center of gravity of the workpiece, is moved downward when the workpiece is conveyed to the storage area. Accordingly, even when the leading end of the workpiece rebounds after the leading end of the workpiece is brought into contact with the anterior wall, the rear end of the workpiece contacts the inner surface of the posterior wall. With this structure, the workpiece can be reliably stored in the storage area while preventing the rear end of the workpiece from getting over the posterior wall.

Further, in the pressure control step, it is preferable to spray an air downward toward the rear end side of the workpiece from above the workpiece.

According to this structure, the rear end of the workpiece can be easily moved downward only by spraying the air downward toward the rear end of the workpiece from above the workpiece.

Further, in the pressure control step, it is preferable to spray the air when the rear end side of the workpiece enters into an injection range of the air.

According to this structure, the air is not sprayed toward the front end side of the workpiece, thereby preventing the front end side of the workpiece from moving downward.

The workpiece is preferably conveyed in a state where the workpiece is supported by a conveyance support member so as to prevent a front end side of the workpiece from hanging down, until the rear end side of the workpiece enters into the injection range of the air.

According to this structure, the front end side of the workpiece can be prevented from hanging down even when the air is sprayed toward the front end side of the workpiece. Accordingly, the air can be constantly sprayed to the workpiece.

Further, in the pressure control step, it is preferable to spray the air upward toward the front end side of the workpiece front below the workpiece.

According to this structure, the front end side of the workpiece is moved upward by spraying the air toward the front end of the workpiece, thereby allowing the workpiece to rotate about the center of gravity of the workpiece and allowing the rear end side of the workpiece to move downward.

According to the present invention, it is possible to reliably store the workpiece in the storage area.

BRIEF DESCRIPTION OF THE DRAWINGS

FIG. 4 is a side view showing a second storage case in the conductor piece supply device and a rotation shaft that supports the second storage case;

FIG. 6 is a sectional view showing the first storage case and a second air nozzle;

FIG. 7 is a flowchart showing an operation for supplying, by the conductor piece supply device, conductor pieces sent from two conductor piece manufacturing devices to a molding device as a conductor piece set;

DESCRIPTION OF THE PREFERRED EMBODIMENTS

Embodiments of the present invention will be described below with reference to the drawings.

First Embodiment

Figure 1:
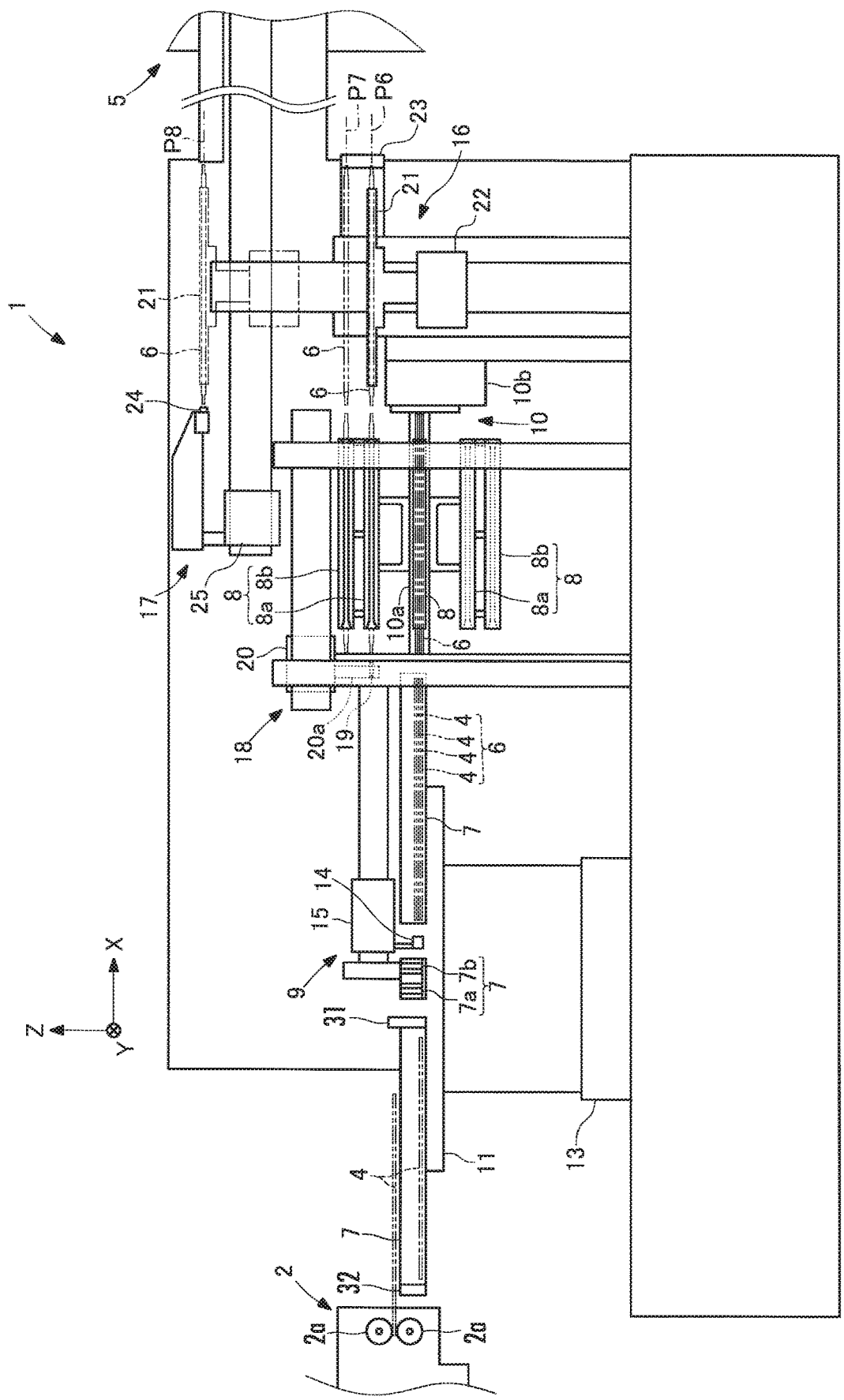
FIG. 1 is a front view showing a conductor piece supply device according to one embodiment of the present invention.
Figure 2:
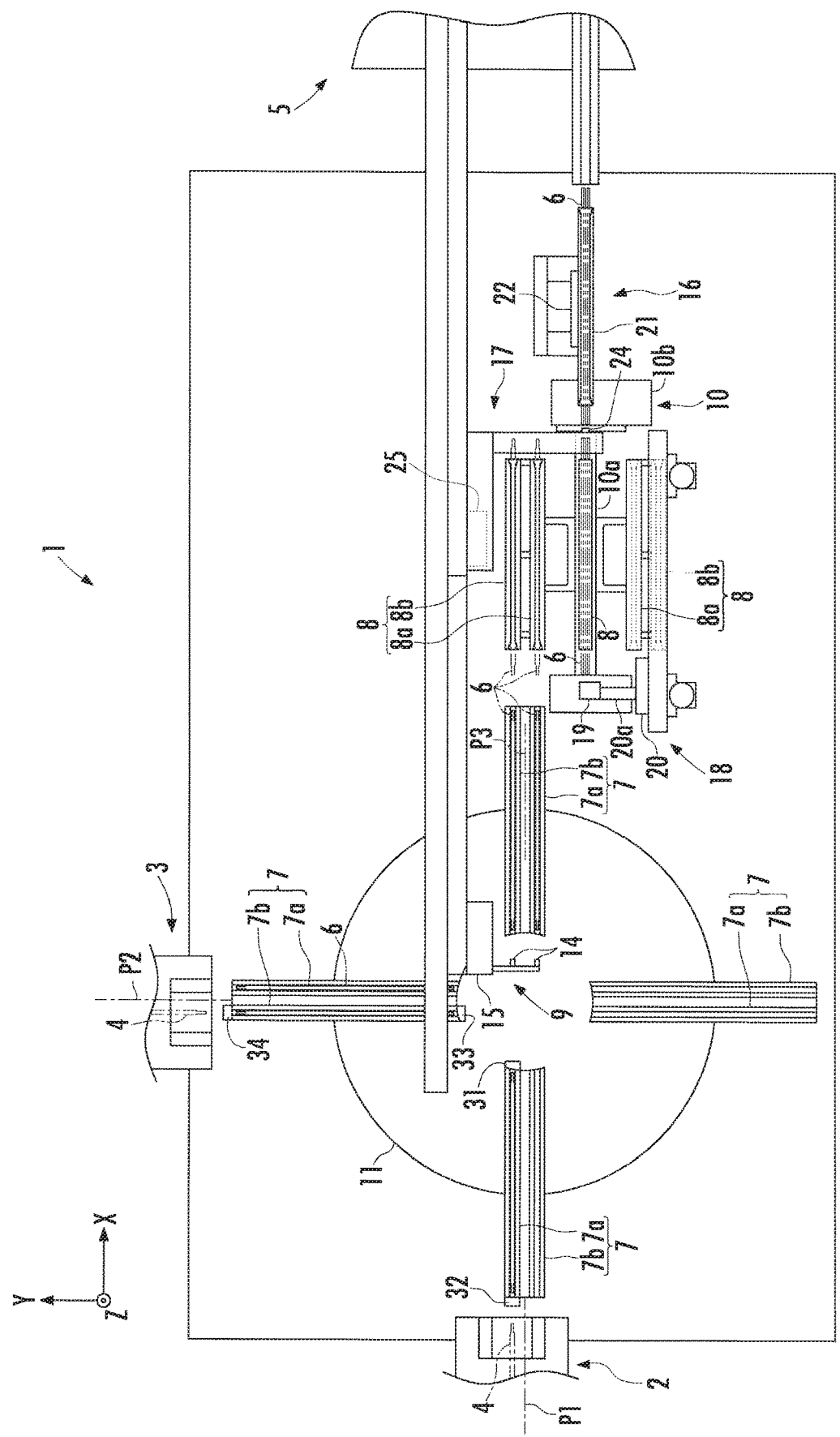
FIG. 2 is a plan view showing the conductor piece supply device.

As shown in FIGS. 1 and 2, a conductor piece supply device 1 receives conductor pieces 4 (workpieces) which are delivered by two conductor piece manufacturing devices 2 and 3, and supplies the conductor pieces to a molding device 5. The conductor piece manufacturing device 2 includes a pair of upper and lower conveyance rollers 2a which sandwich each conductor piece 4. Similarly, the conductor piece manufacturing device 3 includes a pair of upper and lower conveyance rollers 3a which sandwich each conductor piece 4 (see FIG. 6).

The conductor piece 4 is manufactured by cutting an insulating-coated flat wire at a predetermined length in the conductor piece manufacturing devices 2 and 3. Accordingly, the conductor piece 4 has a rectangular cross-section, two long-side surfaces, and two short-side surfaces. A direction perpendicular to the two long-side surfaces is a thickness direction of the conductor piece 4, and a direction perpendicular to the two short-side surfaces is a width direction of the conductor piece 4. Note that insulating coating on both ends of each conductor piece 4 is removed.

The conductor pieces 4 are sequentially delivered one by one from each of the conductor piece manufacturing devices 2 and 3 to the conductor piece supply device 1. As shown in FIG. 1, when an X-axis, a Y-axis, and a Z-axis are defined, the conductor piece 4 from the conductor piece manufacturing device 2 is delivered in a positive direction of the X-axis in a posture in which the lengthwise direction of the conductor piece 4 coincides with the X-axis direction and the width direction of the conductor piece 4 coincides with the Y-axis direction.

The conductor piece 4 from the conductor piece manufacturing device 3 is delivered in a negative direction of the Y-axis in a posture in which the lengthwise direction of the conductor piece 4 coincides with the Y-axis direction and the width direction of the conductor piece 4 coincides with the X-axis direction. Even when the conductor pieces 4 are delivered from either one of the conductor piece manufacturing devices 2 and 3, the delivered conductor pieces 4 are received by the conductor piece supply device 1 in such a manner that every four conductor pieces are superimposed.

The conductor piece supply device 1 includes four first storage cases 7 for receiving the conductor pieces 4 from the conductor piece manufacturing devices 2 and 3, four second storage cases 8 respectively corresponding to the first storage cases, a transport unit 9 for transporting each conductor piece set 6 including four conductor pieces 4 in the respective first storage cases 7 to the corresponding second storage case 8, and a rotation unit 10 for causing the second storage cases 8 to rotate.

In each first storage case 7, first storage recesses 7a and 7b in which the conductor pieces 4 are stored are formed. Each of the first storage recesses 7a and 7b has an opening at a rear end face thereof on the upstream side of the conveyance direction of the conductor piece 4, and another opening at a leading end face thereof on the downstream side of the conveyance direction.

Each first storage case 7 is attached to a rotary table 11 which includes a table surface parallel to an XY plane. Each of the first storage cases 7 extend along the radial direction of the rotary table 11 and form an angle of 90° therebetween. An end on the outside (rear end side) in the radial direction of the first storage case 7 is located on the same circumference about the rotation axis of the rotary table 11.

The first storage case 7 sequentially receives the conductor pieces 4 in a superimposed manner at a delivery position where the conductor pieces 4 are delivered one by one from the conductor piece manufacturing device 2, so that a conductor piece set 6 including four conductor pieces 4 is formed. A structure for storing the conductor pieces 4 in each of the first storage recesses 7a and 7b of the first storage case 7 will be described later.

Figure 3A:
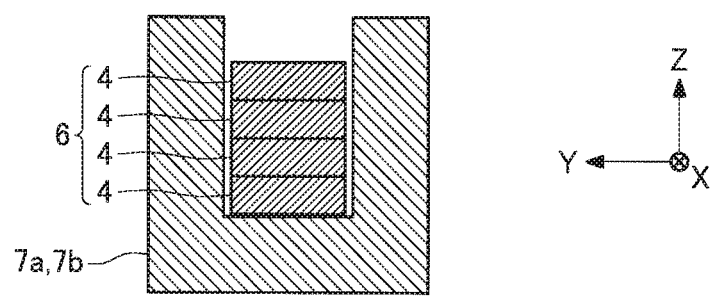
FIGS. 3A and 3B are side views showing a conductor piece set obtained in the conductor piece supply device before and after posture conversion.

The conductor piece set 6 including four conductor pieces 4 which are superimposed on each other has a posture in which the thickness direction of the conductor piece 4 matches the Z-axis direction (vertical direction) (see FIG. 3A). The posture of the conductor piece set 6 is converted into a posture in which the width direction of the conductor piece 4 coincides with the Z-axis direction (see FIG. 3B), and the conductor piece set is supplied to the molding device 5. The conductor piece set 6 supplied to the molding device 5 is formed into a substantially U-shape in the molding device 5, and is used for a stator coil.

Below the rotary table 11, a rotational drive unit 13 for causing the rotary table 11 to rotate about the rotation axis in the vertical direction, is provided. The rotational drive unit 13 causes the rotary table 11 to rotate by 90° to sequentially reach a first position P1 where each first storage case 7 is parallel to the X-axis and faces the conductor piece manufacturing device 2.

The conductor piece manufacturing device 2 is arranged at a position where the conductor pieces 4 can be delivered into the first storage recess 7a of the first storage case 7 located at the first position P1. Further, the conductor piece manufacturing device 3 is arranged at a position where the conductor pieces 4 can be sequentially delivered into the first storage recess 7b of the first storage case 7 located at a second position P2.

In each second storage case 8, second storage recesses 8a and 8b which are parallel to each other, are formed. The second storage case 8 is opened at both ends thereof so that the conductor piece set 6 can be received in each second storage recesses 8a and 8b.

The interval between the second storage recesses 8a and 8b in the second storage case 8 is the same as the interval between the first storage recesses 7a and 7b in each first storage case 7. The conductor piece set 6 is transported to the second storage recesses 8a and 8b in each second storage case 8 from the first storage recesses 7a and 7b in the corresponding first storage case 7.

The rotation unit 10 includes a rotation shaft 10a that supports four second storage cases 8, and a drive unit 10b that causes the rotation shaft 10a to rotate. As shown in FIG. 4, the rotation shaft 10a supports the four second storage cases 8 in parallel to the rotation shaft 10a at equal distances from the rotation shaft 10a and at regular intervals (at an interval of 90° with a center angle about the central axis of the rotation shaft 10a).

The second storage recesses 8a and 8b in each second storage case 8 are arranged in such a manner that the second storage recess 8a is located on the central axis side than the second storage recess 8b on a plane parallel to a plane including the central axis of the rotation shaft 10a.

The rotation unit 10 causes the four second storage cases 8 to rotate by 90°. The rotation direction is a direction in which a right screw rotates moving in the positive direction of the X-axis. Thus, as shown in FIG. 4, each second storage case 8 rotates around the rotation shaft 10a in such a manner that each second storage case 8 is sequentially located at a fourth position P4, which is a position in a positive direction of the Y-axis with respect to the central axis of the rotation shaft 10a, and at a fifth position P5 which is a position obtained after further rotated by 90° from the fourth position P4.

The position of the rotation unit 10 is determined in such a manner that the second storage case 8 located at the fourth position P4 is positioned on a straight line with respect to the first storage case 7 located at a third position P3 as shown in FIG. 2. The transport unit 9 includes a first delivery member 14 delivering the conductor piece sets 6 in the first storage recesses 7a and 7b of the first storage case 7 located at the third position P3 by pressing the conductor piece set 6 from the negative direction of the X-axis, and a first stage 15 for supporting the first delivery member 14 and causing the first delivery member 14 to move in the X-axis direction by a linear motor (not shown).

Figure 3B:
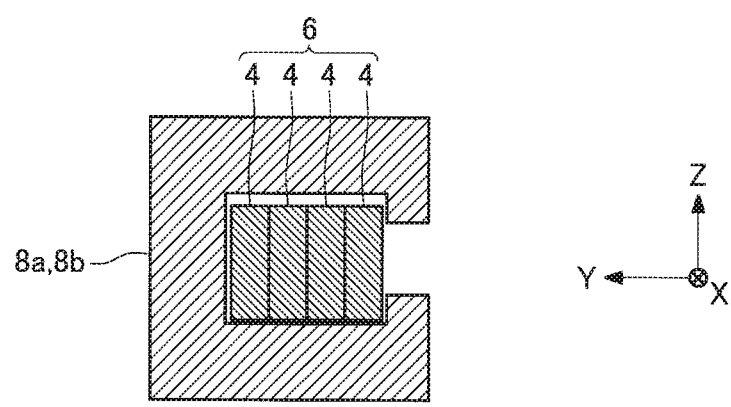

The transport unit 9 causes the first stage 15 to move the first delivery member 14, thereby allowing the conductor piece sets 6 in the first storage recesses 7a and 7b located at the third position P3 to be respectively inserted into the second storage recesses 8a and 8b of the second storage case 8 located at the fourth position P4. FIG. 3B shows a cross-section of the conductor piece 4 which is transported into the second storage recess 8a or 8b of the second storage case 8 located at the fifth position P5.

Between the rotation unit 10 and the molding device 5, a hoisting unit 16 that receives the conductor piece set 6, which is transferred from the second storage recesses 8a and 8b of the second storage case 8 located at the fifth position and causes the received conductor piece set 6 to ascend to a predetermined eighth position P8, is provided. The conductor piece set 6 caused to ascend to the eighth position P8 is supplied to the molding device 5 by the supply unit 17.

The transfer of the conductor piece set 6 from the second storage recesses 8a and 8b to the hoisting unit 16 is performed by the transfer unit 18. The transfer unit 18 includes a second delivery member 19 for delivering each conductor piece set 6 in the second storage recesses 8a and 8b located at the fifth position P5 by pushing out the conductor piece set 6 from the negative direction of the X-axis, and a second stage 20 for supporting the second delivery member 19 and causing the second delivery member 19 to move in the X-axis direction by the linear motor (not shown).

The second stage 20 is provided with a displacement unit 20a for displacing the second delivery member 19 in the Z-axis direction. The displacement unit 20a positions the second delivery member 19 at a predetermined upper position or a predetermined lower position so that each conductor piece set 6 in the second storage recesses 8a and 8b can be delivered to the hoisting unit 16 at each timing by the second delivery member 19.

Specifically, when the conductor piece set 6 in the second storage recess 8a is delivered, the second delivery member 19 is positioned at the lower position corresponding to the delivered position, and when the conductor piece set 6 in the second storage recess 8b is delivered, positioned at the upper position corresponding to the delivered position.

The hoisting unit 16 includes a third storage case 21 which receives the conductor piece set 6 delivered from the second storage recess 8a or 8b of the second storage case 8 located at the fifth position P5, and a third stage 22 which supports the third storage case 21 and causes the third storage case 21 to ascend or descend by the linear motor (not shown).

The third storage case 21 is provided with a storage recess that is opened at both ends thereof to receive the conductor piece set 6. The hoisting unit 16 causes the third stage 22 to ascend or descend, thereby positioning the third storage case 21 at a sixth position P6, a seventh position P7, and the eighth position P8.

The sixth position P6 is a position where the third storage case 21 is aligned straight with the second storage recess 8a of the second storage case 8 located at the fifth position P5 in the positive direction of the X-axis. The seventh position P7 is a position where the third storage case 21 is aligned straight with the second storage recess 8b of the second storage case 8 located at the fifth position P5 in the positive direction of the X-axis. The eighth position P8 is a position where the conductor piece set 6 is delivered to the molding device 5 from the third storage case 21.

The third storage case 21 positioned at the sixth position P6 can receive the conductor piece set 6 delivered from the second storage recess 8a of the second storage case 8 located at the fifth position P5. The third storage case 21 positioned at the seventh position P7 can receive the conductor piece set 6 delivered from the second storage recess 8b of the second storage case 8 located at the fifth position P5.

A contact member 23 is provided at the X-axis-positive-direction-side part of the hoisting unit 16 corresponding to the sixth position P6 and the seventh position P7. When each conductor piece set 6 is delivered from the second storage recesses 8a and 8b to the hoisting unit 16, the contact member 23 contacts the right end of each of four conductor pieces 4 constituting the conductor piece set 6, to thereby align the position of the right thereof.

The supply unit 17 includes a third delivery member 24 for delivering each conductor piece set 6 in the third storage case 21 positioned at the eighth position P8 by the hoisting unit 16 by pushing out the conductor piece set 6 from the negative direction of the X-axis, and a fourth stage 25 for supporting the third delivery member 24 and causing the third delivery member 24 to move in the X-axis direction by the linear motor (not shown). The supply unit 17 causes the fourth stage 25 to move the third delivery member 24, thereby making it possible to deliver the conductor piece set 6 in the third storage case 21 to the molding device 5.

As shown in FIG. 2, an upper part of the rotary table 11 is provided with a first leading end plate 31 (anterior wall) that covers a leading end face at an opening of the first storage recess 7a of the first storage case 7 located at the first position P1, and a first rear end plate 32 (posterior wall) that covers a rear end face at an opening of the first storage recess 7a (storage area) of the first storage case 7 located at the first position P1. Similarly, an upper part of the rotary table 11 is provided with a second leading end plate 33 that covers a leading end face of the first storage recess 7b of the first storage case 7 located at the second position P2, and a second rear end plate 34 that covers a rear end face of the first storage recess 7b of the first storage case 7 located at the second position P2. Each of the plates 31 to 34 is fixed to a fixed plate (not shown) so that each plate remains at the same position even when the rotary table 11 is rotated.

As shown in FIG. 5, the first rear end plate 32 is formed with the same height as that of the first storage case 7, and the first leading end plate 31 is formed with a height higher than the height of the first rear end plate 32 and is formed of, for example, iron.

The leading end of each conductor piece 4 conveyed from the conductor piece manufacturing device 2 toward the first storage recess 7a of the first storage case 7 located at the first position P1 contacts the first leading end plate 31, and then the conductor piece 4 is stored in the first storage recess 7a. After the leading end of the conductor piece 4 contacts the first leading end plate 31, the conductor piece 4 may rebound and the rear end thereof may get over the first rear end plate 32.

In order to prevent the rear end of the conductor piece from getting over the first rear end plate, a first air nozzle 36 for spraying air toward the conductor piece 4 is provided. The first air nozzle 36 is arranged at a position where the air is sprayed from above toward the rear end of the conductor piece from the center of the conductor piece 4, which is the center of gravity of the conductor piece 4, in the state where the leading end of the conductor piece 4 contacts the first leading end plate 31. The first air nozzle 36 is connected to an air supply device 38 that supplies air. The air supply device 38 is connected to a storage control unit 40 and is controlled to be driven by the storage control unit 40.

The first leading end plate 31 is provided with a first contact detection sensor 41 which detects that the leading end of the conductor piece 4 contacts the first leading end plate 31. The first contact detection sensor 41 is connected to the storage control unit 40.

[Storage Control by Pressure Control (Pressure Control Step)]

Figure 5A:
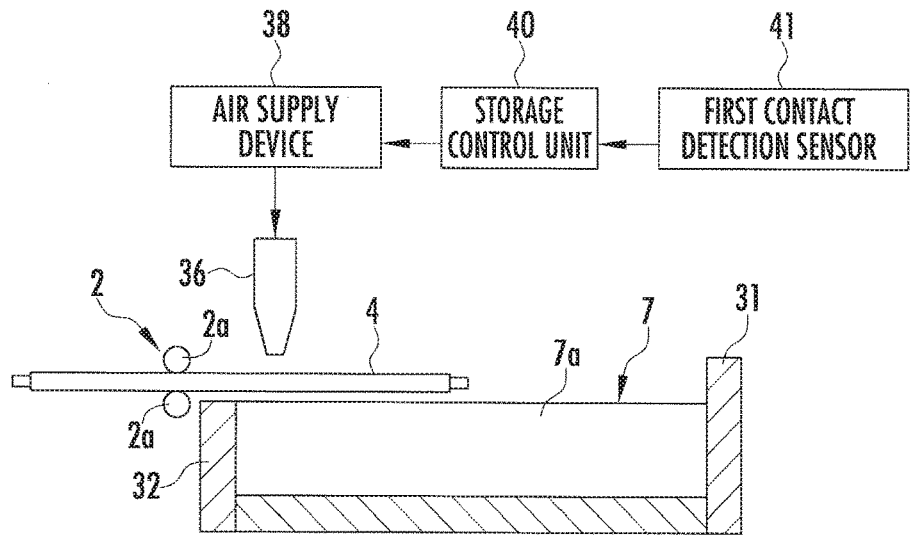
FIGS. 5A to 5D are sectional views showing a first storage case and a first air nozzle and illustrating an operation flow when a conductor piece is stored in the first storage case.

As shown in FIG. 5A, before the conductor piece 4 contacts the first leading end plate 31, the air supply device 38 is not driven by the storage control unit 40, and thus the air is not sprayed toward the conductor piece 4 from the first air nozzle 36.

Figure 5B:
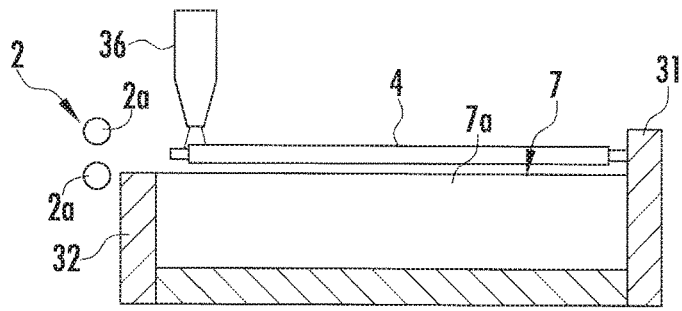

As shown in FIG. 5B, when the conductor piece 4 contacts the first leading end plate 31, the first contact detection sensor 41 detects the contact of the conductor piece 4, and transmits a contact detection signal to the storage control unit 40.

Upon receiving the contact detection signal, the storage control unit 40 causes the air supply device 38 to be driven for a predetermined period to spray the air toward the conductor piece 4 from the first air nozzle 36. By the air spray, the pressure of gas within the first storage recess 7a is controlled. Note that the air spraying direction is not limited to a downward parallel direction. In the case of FIG. 5, the air may be sprayed obliquely leftward in the downward direction.

Figure 5C:
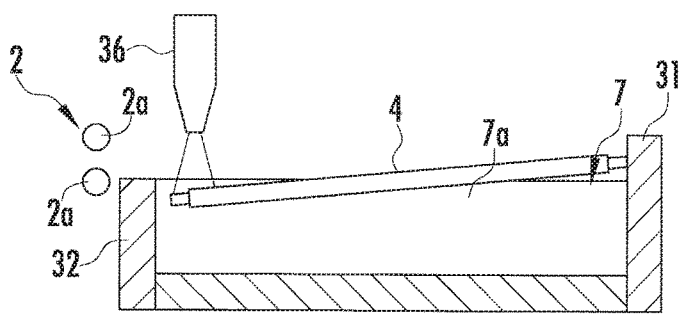
Figure 5D:
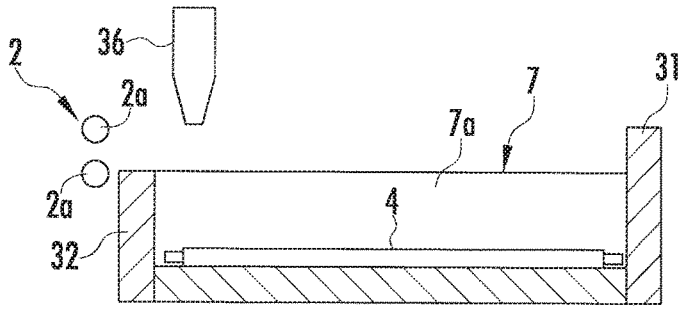

As shown in FIG. 5C, the air spray brings the conductor piece 4 into a tilted state in which the rear end of the conductor piece 4 is moved downward. Accordingly, even when the conductor piece 4 contacts the first leading end plate 31 and rebounds, the rear end of the conductor piece 4 contacts the inner wall surface of the first rear end plate 32. This prevents the rear end of the conductor piece 4 from getting over the first rear end plate 32. Consequently, as shown in FIG. 5D, the conductor piece 4 can be reliably stored in the first storage recess 7a. The storage control as described above is carried out four times, thereby forming the conductor piece set 6 including four conductor pieces 4.

As shown in FIG. 6, the second leading end plate 33 and the second rear end plate 34 have structures similar to those of the first leading end plate 31 and the first rear end plate 32, respectively. The second leading end plate 33 is provided with a second contact detection sensor 42 and a second air nozzle 44. The second air nozzle 44 is connected to the air supply device 46. Even when each conductor piece 4 is stored in the first storage recess 7b, the storage control unit 40 causes the air supply device 46 to be drive in a manner similar to the air supply device 38 in response to a detection signal from the second contact detection sensor 42.

FIG. 7 shows a supply operation for supplying the conductor pieces 4 delivered from the conductor piece manufacturing devices 2 and 3 as the conductor piece set 6 in one first storage case 7 to the conductor piece supply device 1. In the supply operation, as shown in FIG. 7, first, an arrangement step of arranging the first storage case 7 at the first position P1 is carried out by causing the rotary table 11 to be rotated by the rotational drive unit 13 (step S1).

As a result, the first storage recess 7a of the first storage case 7 is arranged at the delivery position where the conductor pieces 4 are sequentially delivered one by one from the conductor piece manufacturing device 2. The conductor piece 4 to be delivered has a posture in Which the thickness direction of the conductor piece 4 coincides with the vertical direction Z-axis direction) and the lengthwise direction of the conductor piece 4 coincides with the delivery direction (in the positive direction of the X-axis). The delivery of each conductor piece 4 is performed at an interval of, for example, one second.

After that, a superimposing step in Which the first storage recess 7a receives four conductor pieces 4, which are sequentially delivered from the conductor piece manufacturing device 2, in such a manner that the conductor pieces 4 are vertically superimposed on each other, is carried out (step S2). In this step S2, the above-described storage control (pressure control step) is carried out, thereby making it possible to reliably store the conductor pieces 4 in the first storage recess 7a. Consequently, the conductor piece set 6 including four conductor pieces 4 that are superimposed on each other is obtained in the first storage recess 7a.

Next, an arrangement step of arranging the first storage case 7 at the second position P2 by rotating the rotary table 11 by 90°, is carried out (step S3). As a result, the first storage recess 7b of the first storage case 7 is arranged at the delivery position where the conductor pieces 4 are sequentially delivered one by one from the conductor piece manufacturing device 3.

The conductor piece 4 to be delivered has a posture in which the thickness direction of the conductor piece 4 coincides with the vertical direction (Z-axis direction) and the lengthwise direction of the conductor piece 4 coincides with the delivery direction (in the negative direction of the Y-axis). The delivery of each conductor piece 4 is performed at an interval of, for example, one second.

After that, a superimposing step in Which the first storage recess 7b receives four conductor pieces 4, which are sequentially delivered from the conductor piece manufacturing device 3, in such a manner that the conductor pieces 4 are vertically superimposed on each other, is carried out (step S4). Consequently, the conductor piece set 6 including four conductor pieces 4 that are superimposed on each other is obtained in the first storage recess 7b. In this step S4, the above-described storage control is carried out, thereby making it possible to reliably store the conductor pieces 4 in the first storage recess 7b. Thus, the conductor piece set 6 including four conductor pieces 4 that are superimposed on each other is obtained in the first storage recess 7b.

Next, the rotary table 11 is rotated by 90°. This allows the first storage case 7 to be positioned at the third position P3 which is opposite to the first position P1 on the rotary table 11. In synchronization with this operation, the rotation unit 10 allows the second storage case 8 corresponding to the first storage case 7 to be positioned at the fourth position P4 (see FIG. 4) (step S5).

After that, a transport step of transporting each conductor piece set 6 in the first storage recesses 7a and 7b of the first storage case 7 to the second storage recesses 8a and 8b of the second storage case 8 is carried out (step S6). This transport step is simultaneously carried out for both the conductor piece sets 6 by causing the first stage 15 to move the first delivery member 14 while pushing out the both conductor piece sets 6 in the first storage recesses 7a and 7b by the first delivery member 14 of the transport unit 9.

Next, a rotation step in which the rotation unit 10 rotates the second storage case 8 by 90°, is carried out. By this step, the second storage case 8 is positioned at the fifth position P5. Further, by this step, the posture of the both conductor piece sets 6 in the second storage case 8 is converted to a posture in which the width direction of the conductor piece 4 coincides with the vertical direction (step S7).

Next, the conductor piece set 6 in the second storage recess 8a of the second storage case 8 is delivered to the third storage case 21, which is located at the sixth position P6, by the transfer unit 18 (step S8). Next, the third storage case 21 is moved from the sixth position P6 to the eighth position P8 by the hoisting unit 16 (step S9). Next, the conductor piece set 6 in the third storage case 21 is supplied to the molding device 5 by the supply unit 17 (step S10).

Next, the third storage case 21 is moved from the eighth position P8 to the seventh position P7 by the hoisting unit 16 (step S11). Next, in steps S12 to S14, like in steps S8 to S10, the operation of delivering the conductor piece set 6 in the second storage recess 8b of the second storage case 8 to the third storage case 21, moving the third storage case 21 to the eighth position P8, and supplying conductor piece set 6 to the molding device 5 is carried out.

The operation in steps S1 to S14 is repeated until it is determined that the supply operation shown in FIG. 3 is completed in step S15. While FIG. 3 illustrates the operation in which one first storage case 7 is focused and the conductor piece set 6 formed in one first storage case 7 is supplied to the molding device 5, the conductor piece sets 6 in the other first storage cases 7 are also supplied to the molding device 5 in the same manner as described above.

Second Embodiment

In a second embodiment shown in FIG. 8, the first contact detection sensor 41 is not provided and the storage control unit 40 controls the first air nozzle 36 to constantly eject air. Note that the components of the second embodiment that are similar to those of the above embodiment are denoted by the same reference numerals, and detailed descriptions thereof are omitted.

Figure 8A:
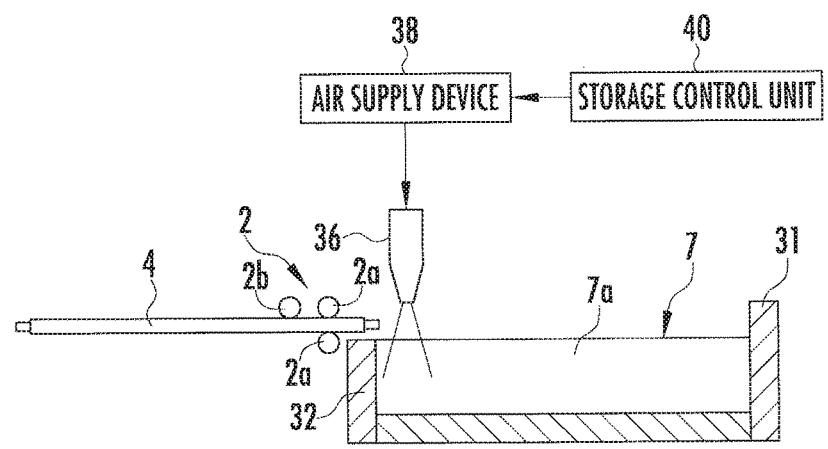
FIGS. 8A to 8E are sectional views showing a first storage case and a first air nozzle and illustrating an operation flow when a conductor piece is stored in the first storage case according to a second embodiment.

As shown in FIG. 8A, the storage control unit 40 controls the first air nozzle 36 to eject air in a state before the conductor piece 4 contacts the first leading end plate 31.

The conductor piece manufacturing device 2 includes a support roller 2b for supporting the upper surface of each conductor piece 4 at an upstream side of the conveyance direction of the conductor piece 4 relative to the conveyance rollers 2a, in addition to the pair of upper and lower conveyance rollers 2a. Note that a rotation member, such as a support roller, is not particularly limited. For example, a slidably fixing conveyance guide or the like may be installed.

Figure 8B:
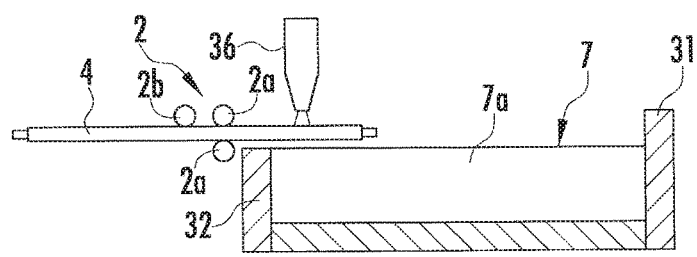

As shown in FIG. 8B, when the leading end of the conductor piece 4 enters into the air injection range of the first air nozzle 36, the air is sprayed to the leading end of the conductor piece 4. Even in state where the air is sprayed, the upper surface of the rear end of the conductor piece 4 is supported by the support roller 2b. Accordingly, the air spray prevents the leading end of the conductor piece 4 from hanging down.

Figure 8C:
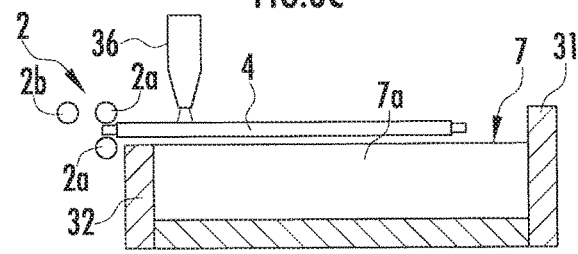

As shown in FIG. 8C, when the conductor piece 4 is separated from the support roller 2b, the conductor piece 4 is moved downward by the air sprayed from the first air nozzle 36. At this point, the air sprayed from the first air nozzle 36 is sprayed to the rear end of the conductor piece 4. Consequently, the air spray prevents the leading end of the conductor piece 4 from moving downward.

Figure 8D:
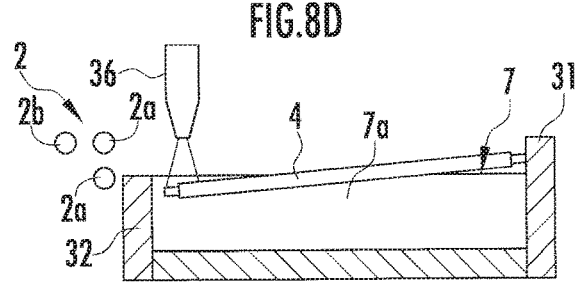
Figure 8E:
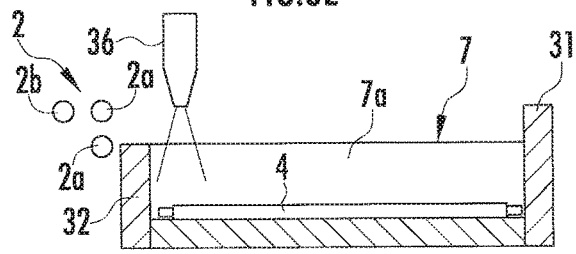

As shown in FIG. 8D, the air spray brings the conductor piece 4 into a tilted state in which the rear end thereof is moved downward. Accordingly, even when the conductor piece 4 contacts the first leading end plate 31 and rebounds, the rear end of the conductor piece 4 contacts the inner wall surface of the first rear end plate 32. Thus, since the rear end of the conductor piece 4 is prevented from getting over the first rear end plate 32, as shown in FIG. 8E, the conductor piece 4 can be reliably stored in the first storage recess 7a.

Third Embodiment

In a third embodiment shown in FIG. 9, the first air nozzle 36 ejects air upward. Note that the components of the third embodiment that are similar to those of the above embodiments are denoted by the same reference numerals, and detailed descriptions thereof are omitted.

Figure 9A:
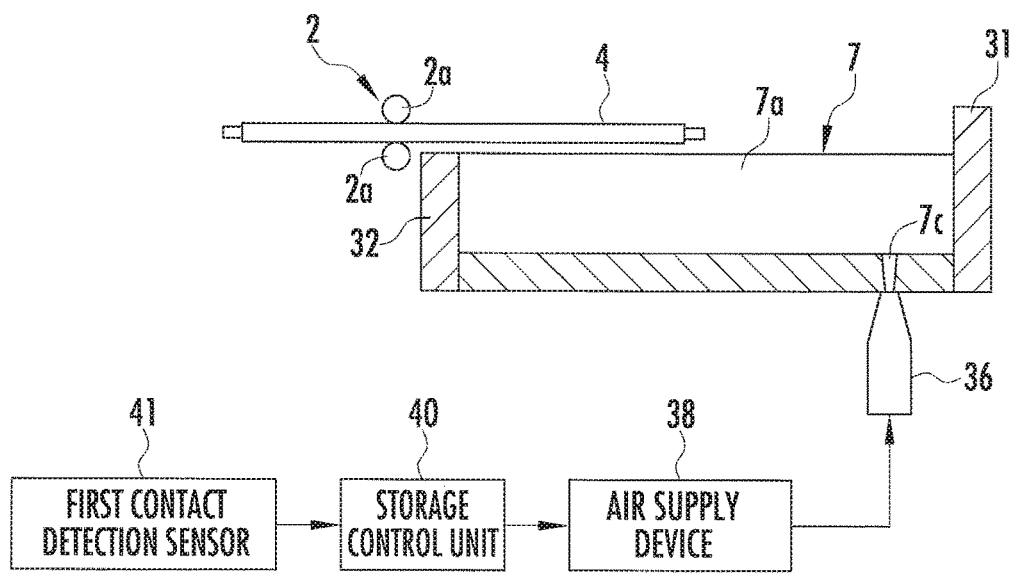
FIGS. 9A to 9C are sectional views showing a first storage case and a first air nozzle and illustrating an operation flow when a conductor piece is stored in the first storage case according to a third embodiment.

As shown in FIG. 9A, the first air nozzle 36 is arranged at the front end of the first storage case 7 in a lower part thereof. The first storage recess 7a of the first storage case 7 is provided with an air hole 7c through which the air injected from the first air nozzle 36 passes. The air injected from the first air nozzle 36 is injected upward through the air hole 7c.

Figure 9B:
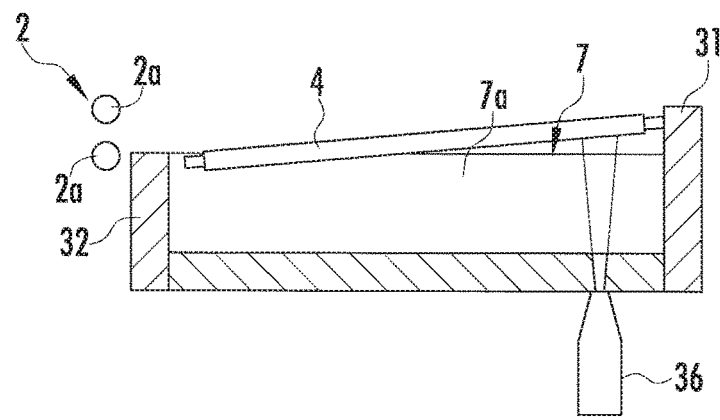

As shown in FIG. 9B, when the conductor piece 4 contacts the first leading end plate 31, the first contact detection sensor 41 detects a contact of the conductor piece 4, and transmits a contact detection signal to the storage control unit 40.

Upon receiving the contact detection signal, the storage control unit 40 causes the air supply device 38 to be driven to spray air toward each conductor piece 4 from the first air nozzle 36 through the air hole 7c. This air spray allows the conductor piece 4 to rotate counterclockwise in FIG. 9B about the center of gravity of the conductor piece 4, thereby bringing the conductor piece 4 into a tilted state in which the leading end of the conductor piece 4 is moved upward and the rear end thereof is moved downward. Thus, even when the conductor piece 4 contacts the first leading end plate 31 and rebounds, the rear end of the conductor piece 4 contacts the inner wall surface of the first rear end plate 32, thereby preventing the rear end of the conductor piece 4 from getting over the first rear end plate 32. Note that the air supply device 38 may be driven before the conductor piece 4 contacts the first leading end plate 31.

Figure 9C:
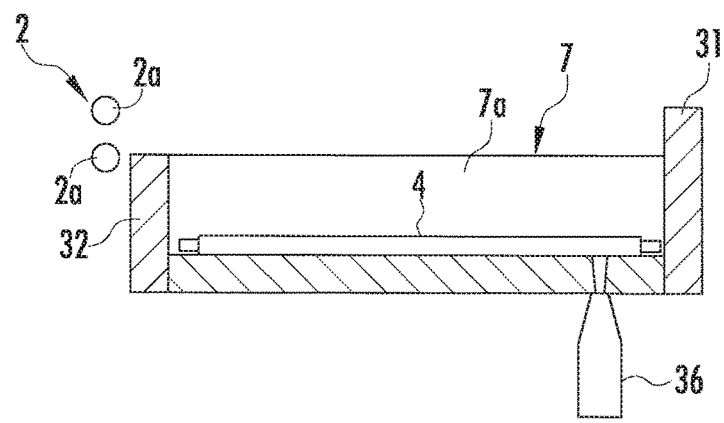
Figure 10A:
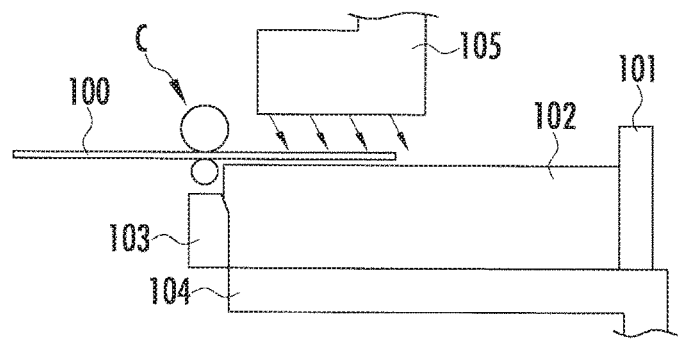
FIGS. 10A to 10D are explanatory diagrams showing a conventional operation flow when a workpiece is stored in a storage area.
Figure 10B:
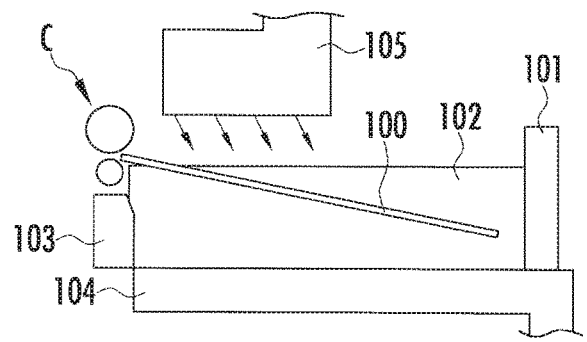
Figure 10C:
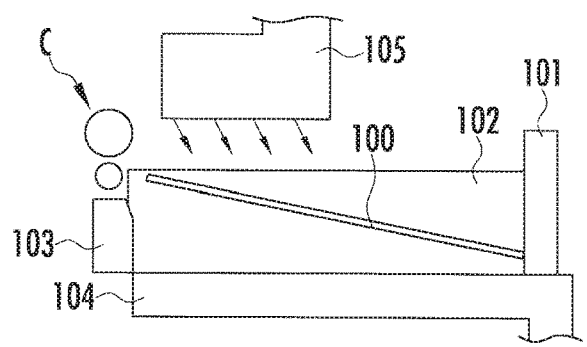
Figure 10D:
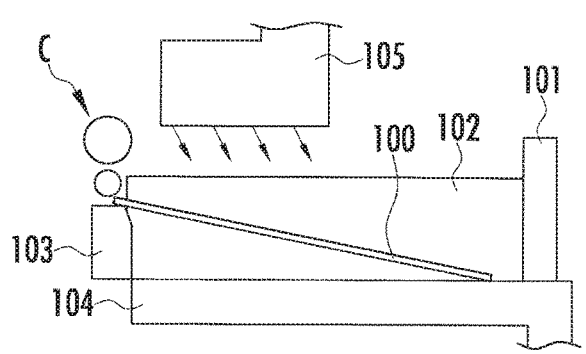

The storage control unit 40 stops driving of the air supply device 38 after a lapse of a predetermined period. Thus, as shown in FIG. 9C, the conductor piece 4 can be reliably stored in the first storage recess 7a. In the third embodiment, only one conductor piece 4 is stored in the first storage recess 7a.

Note that in the above embodiments, the present invention is applied to the devices that store conductor pieces in the storage recesses of the first storage cases. Objects to be stored are not limited to conductor pieces, and the present invention can be applied to devices that store various forms of workpieces into a storage area. In particular, a member which has a strength sufficient to prevent deformation and is elongated in an advancing direction is likely to be effected by air because of the long distance between the center of gravity and the end thereof, and is likely to obtain the advantageous effects of the present invention. Sheet-like members such as insulating paper, panels, disposable chopsticks, food (e.g., dried noodles such as pasta), and the like are suitably used.

In the first and second embodiments described above, air is sprayed downward from above each conductor piece toward the rear end of the conductor piece, thereby causing the rear end of the conductor piece to move downward. However, the rear end of each conductor piece may be moved downward by controlling the pressure of the gas within the storage recess in such a manner that the rear end of the conductor piece is adsorbed from below.

In the first embodiment, when each conductor piece contacts the first leading end plate, air is sprayed toward the conductor piece from the first air nozzle. Alternatively, the air may be sprayed when the rear end of the conductor piece enters into the air injection range. Further, the air nozzle may be arranged to be movable in the front-back direction so as to follow the rear end of each conductor piece.

The present invention is not limited to the embodiments described above. For example, conductor pieces delivered from a single conductor piece manufacturing device may be used, instead of using conductor pieces delivered from two conductor piece manufacturing devices.

What is claimed is:

1. A workpiece storage method that conveys a workpiece, brings a leading end of the workpiece into contact with an anterior wall provided on a front side of a conveyance direction of the workpiece so as to block further conveyance of the workpiece, and stores the workpiece in a storage area formed of the anterior wall and a posterior wall provided on a rear side of the conveyance direction of the workpiece, the workpiece storage method comprising:
   a pressure control step of controlling a pressure of gas within the storage area in such a manner that a rear end side of the workpiece with respect to a center of the workpiece is moved downward so as to contact the posterior wall when the workpiece is conveyed to the storage area, the center of the workpiece being a center of gravity of the workpiece, wherein air is sprayed in a downward direction toward the workpiece from above the workpiece in the pressure control step; and
   a conveyance step of conveying the workpiece to the storage area in a state where the workpiece is supported by a conveyance support member at a position spaced from the storage area in the conveyance direction of the workpiece and which is upstream in the conveyance direction of the workpiece from a portion of the workpiece where the air is sprayed in the downward direction toward the workpiece from above the workpiece in the pressure control step, so as to prevent a front end side of the workpiece with respect to the center of the workpiece from hanging down, even when the air is sprayed in the downward direction toward the front end side of the workpiece in the pressure control step, the conveyance support member supporting a bottom side of the workpiece while pressing an upper side of the workpiece, the conveyance support member pressing the upper side of the workpiece at a position upstream in the conveyance direction from a position at which the bottom side of the workpiece is supported.

2. The workpiece storage method according to claim 1, wherein in the pressure control step, the air is sprayed in the downward direction toward the rear end side of the workpiece from above the workpiece.

3. The workpiece storage method according to claim 2, wherein in the pressure control step, the air is sprayed when the rear end side of the workpiece enters into an injection range of the air.

4. The workpiece storage method according to claim 1, wherein in the pressure control step, the pressure of gas within the storage area is controlled in such a manner that the rear end side of the workpiece is moved downward before the front end side of the workpiece, so that the rear end side of the workpiece is disposed relatively below the front end side of the workpiece during downward movement of the workpiece into the storage area when the workpiece is conveyed to the storage area.

5. The workpiece storage method according to claim 4, wherein in the pressure control step, the air is sprayed in the downward direction toward the rear end side of the workpiece from above the workpiece.

6. The workpiece storage method according to claim 5, wherein in the pressure control step, the air is sprayed when the rear end side of the workpiece enters into an injection range of the air.

7. The workpiece storage method according to claim 4, wherein in the conveyance step, the conveyance support member prevents the front end side of the workpiece from hanging down lower than the rear end side of the workpiece when the pressure of the gas within the storage area is controlled in the pressure control step when the workpiece is conveyed to the storage area and moved downward into the storage area.

8. The workpiece storage method according to claim 1, wherein in the conveyance step, the conveyance support member prevents the front end side of the workpiece from hanging down lower than the rear end side of the workpiece when the pressure of the gas within the storage area is controlled in the pressure control step when the workpiece is conveyed to the storage area and moved downward into the storage area.

9. The workpiece storage method according to claim 8, wherein in the pressure control step, the air is sprayed in the downward direction toward the rear end side of the workpiece from above the workpiece.

10. The workpiece storage method according to claim 9, wherein in the pressure control step, the air is sprayed when the rear end side of the workpiece enters into an injection range of the air.

* * * * *